(12) United States Patent
Tynys et al.

(10) Patent No.: US 10,571,051 B2
(45) Date of Patent: Feb. 25, 2020

(54) POLYETHYLENE COMPOSITION FOR DRIP IRRIGATION PIPES OR TAPES

(71) Applicants: BOREALIS AG, Vienna (AT); ABU DHABI POLYMERS CO. LTD (BOROUGE) L.L.C., Abu Dhabi (AE)

(72) Inventors: Antti Tynys, Linz (AT); Joel Fawaz, Abu Dhabi (AE)

(73) Assignees: BOREALIS AG, Vienna (AT); ABU DHABI POLYMERS CO. LTD (BOROUGE) L.L.C., Abu Dhabi (AE)

( * ) Notice: Subject to any disclaimer, the term of this patent is extended or adjusted under 35 U.S.C. 154(b) by 0 days.

(21) Appl. No.: 16/462,435

(22) PCT Filed: Nov. 14, 2017

(86) PCT No.: PCT/EP2017/079175
§ 371 (c)(1),
(2) Date: May 20, 2019

(87) PCT Pub. No.: WO2018/095761
PCT Pub. Date: May 31, 2018

(65) Prior Publication Data
US 2019/0271417 A1    Sep. 5, 2019

(30) Foreign Application Priority Data
Nov. 24, 2016    (EP) .................................... 16200547

(51) Int. Cl.
| | |
|---|---|
| *F16L 9/127* | (2006.01) |
| *B29C 48/00* | (2019.01) |
| *B29C 48/09* | (2019.01) |
| *A01G 25/02* | (2006.01) |
| *C08F 110/02* | (2006.01) |

(Continued)

(52) U.S. Cl.
CPC ............ *F16L 9/127* (2013.01); *A01G 25/023* (2013.01); *B29C 48/0022* (2019.02); *B29C 48/09* (2019.02); *C08F 110/02* (2013.01); *C08J 3/226* (2013.01); *C08K 3/04* (2013.01); *B29C 2793/0045* (2013.01); *B29K 2023/06* (2013.01); *B29K 2995/0088* (2013.01); *B29L 2023/22* (2013.01); *B29L 2031/7004* (2013.01)

(58) Field of Classification Search
CPC ...... F16L 9/127; B29C 48/0022; B29C 48/09; B29C 2793/0045; A01G 25/023; C08F 110/02; C08J 3/226; C08K 3/04; B29K 2023/06; B29K 2995/0088; B29L 2031/7004; B29L 2023/22
See application file for complete search history.

(56) References Cited

FOREIGN PATENT DOCUMENTS

| | | |
|---|---|---|
| EP | 0517868 B1 | 12/1992 |
| EP | 688794 B1 | 12/1995 |

(Continued)

OTHER PUBLICATIONS

Kaye, et al, "Definition of terms relating to the non-ultimate mechanical properties of polymers", Pure & Appl. Chem., vol. 70, pp. 701-754, 1998.

(Continued)

*Primary Examiner* — Michael C Miggins
(74) *Attorney, Agent, or Firm* — Tarolli, Sundheim, Covell & Tummino LLP

(57) ABSTRACT

The present invention relates to pellets comprising a polyethylene composition, a pipe or pipe system comprising the pellets as well as a process for the preparation of such a pipe or pipe system.

15 Claims, 2 Drawing Sheets

(51) Int. Cl.
  *C08J 3/22* (2006.01)
  *C08K 3/04* (2006.01)
  *B29L 23/00* (2006.01)
  *B29L 31/00* (2006.01)

(56) References Cited

FOREIGN PATENT DOCUMENTS

| EP | 0810235 B1 | 11/2004 |
|---|---|---|
| EP | 2730612 A1 | 5/2014 |
| WO | 96/18662 A1 | 6/1996 |
| WO | 97/44371 A1 | 11/1997 |
| WO | 2004/055068 A1 | 7/2004 |
| WO | 2004/055069 A1 | 7/2004 |
| WO | 2016/065497 A1 | 5/2016 |

OTHER PUBLICATIONS

Heino, "The influence of molecular structure on some rheological properties of polyethylene", Annual Transactions of the Nordic Rheology Society, vol. 3, 1995.

Heino, E-L, et al., "Rheological Characterization of Polyethylene Fractions", Proc. XIth Int. Congr. on Rheology, Brussels, Belgium, Aug. 17-21, 1992, pp. 360-362.

Extended European Search Report for Application No. 16200547.4-1308, dated Jun. 1, 2017.

POLYETHYLENE COMPOSITION FOR DRIP IRRIGATION PIPES OR TAPES

The present invention relates to pellets comprising a polyethylene composition, a pipe or pipe system comprising the pellets as well as a process for the preparation of such a pipe or pipe system.

In agriculture (farming including fruit production) and other planted green areas like private and public gardens and golf courses, one of the main types of irrigation systems is drip irrigation. The pipes or tapes for the drip irrigation system have perforations arranged at intervals along the pipe or tape wall and typically also so called "emitters", known also e.g. as (drip) inserts, drippers or fittings, which are inserted to the pipe or tape wall at the location of the perforation and are typically designed to charge water at predetermined rate from said perforation.

Drip irrigation pipes and tapes are normally thin-walled with typical diameter of less than 35 mm. The cross-section can be round or flattened to an ellipse shape. Irrigation pipes and tapes are often folded and stored in folded form before and/or after the use requiring excellent flexibility and toughness.

The trend in the production of such drip irrigation pipes or tapes goes towards higher line speeds (150 m/min and above) and thinner tapes or pipes (wall thickness of about 0.4 mm and below). In the production of thin wall drip irrigation tapes having a wall thickness of below 0.4 mm, preferably below 0.2 mm, a polymer composition having good homogeneity and processability is desired. A typical currently used solution is a blend of LDPE (~25%)/LLDPE (~25%)/HDPE (~50%) and carbon black. In the blend, the LDPE component provides good processability (melt strength) which is required to achieve a production line speed of 150 m/min and above. The HDPE component is needed to give mechanical strength (pull strength and burst pressure) of the final pipes or tapes. LLDPE is typically added in order to ensure good weldability of drippers and to ensure sufficient ESCR performance of the pipes and tapes. Carbon black is added to ensure sufficient UV resistance of the tapes, which is needed due to the sun exposure of the pipes and tapes in the final application.

The problem, when a dry blend of different components is used, is related to the limited mixing capacity of single screw extruders. Due to the poor mixing capacity of these extruders, the carbon black is not evenly distributed in the final pipe or tape, and consequently the UV resistance of the pipes or tapes is not sufficient leading to early failures of the pipes or tapes. Also preparing dry blends prior tape extrusion is laborious and time consuming. In addition, mixing ratios might vary from time to time, which leads to inconsistent product quality.

Good homogeneity of the starting materials is also preferred from a production point of view. If a polymer composition containing a high level of inhomogeneities is used in production, the processability is not optimal, and high line production speeds and/or thin wall thickenesses are not achieved. On the other hand, a high density of the material is needed to ensure sufficient mechanical performance (pull strength and burst pressure) of the pipes or tapes having a wall thickness of 0.4 mm and below.

Thus, there is still a need in the art for polyethylene compositions being suitable for the preparation of pipes or tubes having a wall thickness of 0.4 mm and below at a high line production speed. In particular, it is desirable to have a polyethylene compositions providing an excellent balance of processability such as high melt strength, weldability, and good mechanical properties particularly high burst pressure even in very thin pipes.

Accordingly, the present invention is especially directed to pellets comprising a polyethylene composition, the polyethylene composition comprising
  a) at least 60.0 wt.-%, preferably at least 70.0 wt.-%, preferably at least 80.0 wt.-%, preferably from 87.0 to 99.5 wt.-%, of a multimodal ethylene polymer (a), and
  b) from 0.5 to 13.0 wt.-% of a carbon black product (b) based on the total weight (100 wt.-%) of the polyethylene composition
  wherein the polyethylene composition has
    i) a $MFR_2$ (ISO 1133, 2.16 kg load) of 0.2 to 0.3 g/10 min, and
    ii) a density measured according to ASTM D792 of at least 959 kg/m$^3$.

In one embodiment, the polyethylene composition has a) a $MFR_5$ (ISO 1133, 5 kg load) of 0.5 to 1.5 g/10 min, and/or b) a $MFR_{21}$ (ISO 1133, 21.6 kg load) of 20 to 35 g/10 min, and/or c) a $FRR_{21/2}$ (ISO 1133, 21.6 kg load/2.16 kg load) of 100 to 140 g/10 min.

In another embodiment, the polyethylene composition has a) an eta (0.05 rad/s) of at least 51 000 Pas, and/or b) a $SHI_{2.7/210}$ of 30 to 50, and/or c) a die swell (190° C., 2.16 kg load) of at least 1.25.

In yet another embodiment, the polyethylene composition has a) a stress at yield measured according to ISO 527-2 of at least 28 MPa, and/or b) a stress at break measured according to ISO 527-2 of at least 28 MPa, and/or c) a strain at break measured according to ISO 527-2 of at least 800%.

In one embodiment, the multimodal ethylene polymer (a) has a) a density measured according to ASTM D792 in the range from 950 to 965 kg/m$^3$, and/or b) a $MFR_2$ (ISO 1133, 2.16 kg load) of 0.2 to 0.3 g/10 min, and/or c) a $MFR_5$ (ISO 1133, 5 kg load) of 0.5 to 1.5 g/10 min, and/or d) a $MFR_{21}$ (ISO 1133, 21.6 kg load) of 20 to 35 g/10 min, and/or e) a $FRR_{21/2}$ (ISO 1133, 21.6 kg load/2.16 kg load) of 90 to 130 g/10 min.

In another embodiment, the carbon black product (b) is carbon black as such or a carbon black masterbatch comprising carbon black and carrier polymer(s). In case of a masterbatch of the carbon black product (b), the carrier polymer is calculated to the amount of the carbon black product based on the amount (100.0 wt.-%) of the composition of the invention. That is to say, the carrier polymer is not included to nor calculated into the amount of the multimodal ethylene polymer (a) or to any other polymer component (d) optionally present in the polyethylene composition, but to the carbon black product (b) and to the amount thereof based on the total weight (100.0 wt.-%) of the polyethylene composition.

In yet another embodiment, the carbon black product (b) is carbon black as such (neat) and present in the polyethylene composition in an amount from 0.5 to 10.0 wt.-%, preferably from 0.5 to 5.0 wt.-% and most preferably from 1.0 to 4.0 wt.-%, based on the total weight (100.0 wt.-%) of the polyethylene composition, or the carbon black product (b) is a carbon black masterbatch and present in the polyethylene composition in an amount from 0.5 to 10.0 wt.-%, preferably from 0.5 to 8.0 wt.-% and most preferably from 0.5 to 7.0 wt.-%, based on the total weight (100.0 wt.-%) of the polyethylene composition.

The present invention is further directed to a use of the pellets as defined herein for producing a pipe or pipe system.

The present invention is further directed to a pipe or pipe system comprising the pellets as defined herein. In this context it is understood that the pipe or pipe system is produced by meltmixing the pellets in elevated temperature, typically in an extruder, to form the pipe or pipe system. That is to say, the pellets are in the pipe or pipe system in form of a solid meltmix.

In one embodiment, the pipe or pipe system is a drip irrigation pipe or drip irrigation pipe system.

In another embodiment, the pipe or pipe system has a wall thickness of less than 0.4 mm, preferably of less than 0.2 mm.

In yet another embodiment, the pipe or pipe system has a wall thickness of less than 0.2 mm and a burst pressure of more than 0.26 MPa.

The present invention is also directed to a process for the preparation of a pipe or pipe system comprising the steps of
a) providing pellets as defined herein,
b) extruding the pellets of step a), whereby a temperature profile of up to 270° C. is maintained over the length of the extruder, such as to obtain a pipe or pipe system, and
c) introducing perforations for irrigation into the pipe or pipe system obtained in step b).

In one embodiment, the line speed is in the range from 190 to 280 m/min.

In another embodiment, the pellets of step a) are prepared by compounding the multimodal ethylene polymer (a) and the carbon black product (b) at a temperature profile of up to 270° C.

In yet another embodiment, the multimodal ethylene polymer (a) is prepared by i) polymerizing ethylene such as to form a LMW component (A), and ii) polymerizing ethylene and optionally at least one C3-20 alpha olefin comonomer in the presence of component (A) obtained in step i) such as to form a HMW component (B), and iii) compounding the product obtained in step ii) optionally in the presence of additives other than the carbon black product to yield pellets.

The invention is now defined in more detail.

As mentioned above the pellets must comprise a polyethylene composition comprising a multimodal ethylene polymer (a) and a carbon black product (b).

It is appreciated that the carbon black product (b) can be added to the multimodal ethylene polymer (a) as such (neat) or in form of a so-called masterbatch (CBMB), in which carbon black is contained in concentrated form in a carrier polymer.

Additionally, the polyethylene composition may comprise one or more additive(s) (c).

Additives denote compounds selected from the group comprising nucleating agents, processing aids, antistatic agents and stabilizers. More preferably, the additives (c) are selected from the group of nucleating agents and stabilizers. Most preferably, the additives (c) are selected from the group of stabilizers. As a matter of definition, the carbon black product (b) is not an additive (c).

Stabilizers are compounds which are used directly or by combination to prevent the various effects such as oxidation, chain scission and uncontrolled recombination and crosslinking reactions frequently caused by photo oxidation. Typical stabilizers are UV stabilizers, light stabilizers and antioxidants.

Also the additives (c) can be present as such or in form of masterbatch with a carrier polymer, as well known in the art. In case of a masterbatch of one or more additive(s) (c), the carrier polymer is calculated to the amount of the respective additive(s) (c) based on the amount (100.0) %) of the composition of the invention. That is to say, the carrier polymer is not included to nor calculated into the amount of the multimodal ethylene polymer (a) or to any other polymer component (d) optionally present in the polyethylene composition, but to the respective additive(s) (c) and to the amount thereof based on the total weight (100.0 wt.-%) of the polyethylene composition.

It is preferred that the polyethylene composition contains up to 5.0 wt.-%, more preferably from 0.1 to 5.0 wt.-%, even more preferably from 0.1 to 4.0 wt.-%, and most preferably from 0.1 to 3.0 wt.-% of one or more additive(s) (c), based on the total weight (100.0 wt.-%) of the polyethylene composition.

In one embodiment, the polyethylene composition comprises one or more further polymer(s) (d), preferably polyethylene, other than multimodal ethylene polymer (a). If present, the polyethylene composition contains up to 39.4 wt.-%, more preferably up to 35.0 wt.-%, and most preferably up to 30.0 wt.-%, of the further polymer(s) (d), preferably polyethylene, other than multimodal ethylene polymer (a), based of the total weight (100 wt.-%) of the polymer composition.

For example, the polyethylene composition is free of the further polymer(s) (d), preferably polyethylene, other than multimodal ethylene polymer (a).

It is appreciated that the sum of the multimodal ethylene polymer (a), carbon black product (b) and the optional additive(s) (c) and further polymer(s) (d) is 100.0 wt.-%, based on the total weight of the polyethylene composition.

Thus, the polyethylene composition (100 wt.-%) comprises
a) at least 60.0 wt.-%, preferably at least 70.0 wt.-%, more preferably at least 80.0 wt.-%, even more preferably from 87.0 to 99.5 wt.-%, still more preferably from 90.0 to 99.5 wt.-%, still even more preferably from 92.0 to 99.5 wt.-%, and most preferably from 93.0 to 99.5 wt.-%, e.g. from 93.0 to 99.1 wt.-% of a multimodal ethylene polymer (a), based on the total weight (100.0 wt.-%) of the polyethylene composition, and
b) from 0.5 to 13.0 wt.-%, preferably from 0.5 to 10.0 wt.-%, more preferably from 0.5 to 8.0 wt.-%, even more preferably from 0.5 to 7.0 wt.-% and most preferably from 0.9 to 6.0 wt.-% of a carbon black product (b), based on the total weight (100.0 wt.-%) of the polyethylene composition.

In one embodiment, the polymer composition may comprise one or more further polymer(s) (d), preferably polyethylene, which is/are different from the multimodal ethylene polymer (a).

Alternatively, the polyethylene composition (100.0 wt.-%) consists of
a) at least 60.0 wt.-%, preferably at least 70.0 wt.-%, more preferably at least 80.0 wt.-%, even more preferably from 87.0 to 99.5 wt.-%, still more preferably from 90.0 to 99.0 wt.-%, and most preferably from 91.0 to 98.1 wt.-% of a multimodal ethylene polymer (a), based on the total weight (100.0 wt.-%) of the polyethylene composition, and
b) from 0.5 to 13.0 wt.-%, preferably 0.5 to 10.0 wt.-%, more preferably from 0.5 to 8.0 wt.-%, still more preferably from 0.5 to 7.0 wt.-% and most preferably from 0.9 to 6.0 wt.-% of a carbon black product (b), based on the total weight (100.0 wt.-%) of the polyethylene composition, and
c) from 0.1 to 5.0 wt.-%, preferably from 0.1 to 4.0 wt.-%, and most preferably from 0.1 to 3.0 wt.-% of additive(s) (c), based on the total weight (100.0 wt.-%) of the polyethylene composition, and d) optionally the remaining amount up to 100.0 wt.-% is made up of one or more further polymer(s) (d), preferably polyethylene, other than multimodal ethylene polymer (a), preferably from 0 to 39.4 wt.-%, more preferably from 0 to 35.0 wt.-%, and most preferably from 0 to 30.0 wt.-%, based of the total weight (100 wt.-%) of the polymer composition.

Alternatively, the polyethylene composition (100.0 wt.-%) consists of
a) from 82.0 to 99.4 wt.-%, preferably from 85.0 to 99.4 wt.-%, more preferably from 87.0 to 99.4 wt.-%, still more preferably from 89.0 to 99.4 wt.-%, and most preferably from 91.0 to 99.0 wt.-% of a multimodal ethylene polymer (a), based on the total weight (100.0 wt.-%) of the polyethylene composition, and
b) from 0.5 to 13.0 wt.-%, preferably 0.5 to 10.0 wt.-%, more preferably from 0.5 to 8.0 wt.-%, still more preferably from 0.5 to 7.0 wt.-% and most preferably from 0.9 to 6.0 wt.-% of a carbon black product (b), based on the total weight (100.0 wt.-%) of the polyethylene composition, and
c) from 0.1 to 5.0 wt.-%, still more preferably from 0.1 to 4.0 wt.-%, and most preferably from 0.1 to 3.0 wt.-% of additive(s) (c), based on the total weight (100.0 wt.-%) of the polyethylene composition.

It is appreciated that the pellets preferably consist of the polyethylene composition of the invention.

It is required that the polyethylene composition comprises a multimodal ethylene polymer (a).

Usually, an ethylene polymer, comprising at least two polyethylene fractions, which have been produced under different polymerization conditions resulting in different (weight average) molecular weights and molecular weight distributions for the fractions, is referred to as a "multimodal" ethylene polymer. Accordingly, in this sense the ethylene polymer of the invention is a multimodal ethylene polymer. The prefix "multi" relates to the number of different polymer fractions the polymer is consisting of Thus, for example, an ethylene polymer consisting of two fractions is called "bimodal". "Multimodal polyethylene polymer" or "Multimodal ethylene polymer" means herein the multimodality of the polyethylene with respect to the weight average molecular weight (in other terms with respect to molecular weight distribution (MWD)). Herein below the multimodal polyethylene polymer (a) is also referred to as "multimodal ethylene polymer" or "multimodal ethylene polymer of the invention".

A multimodal ethylene polymer (a) is an ethylene homopolymer or an ethylene copolymer with less than 10 mol.-% total comonomer(s) present in the ethylene polymer. The comonomer may be one or more of the monomers selected from the group of C3-C20 alpha olefins, especially propene, 1-butene, 1-hexene, 1-octene, 4-methylpentene, whereby 1-butene and 1-hexene are most common.

It is one requirement of the present invention that the polyethylene composition has a $MFR_2$ (ISO 1133, 2.16 kg load) of 0.2 to 0.3 g/10 min. Preferably, the polyethylene composition has a $MFR_2$ (ISO 1133, 2.16 kg load) of 0.2 to 0.28 g/10 min and most preferably of 0.21 to 0.25 g/10 min.

The polyethylene composition preferably has a $MFR_5$ (ISO 1133, 5 kg load) of 0.5 to 1.5 g/10 min, more preferably of 0.7 to 1.4 g/10 min and most preferably of 0.9 to 1.3 g/10 min.

Additionally or alternatively, the polyethylene composition preferably has a $MFR_{21}$ (ISO 1133, 21.6 kg load) of 20 to 35 g/10 min, more preferably of 20 to 33 g/10 min and most preferably of 27 to 31 g/10 min.

Additionally or alternatively, the polyethylene composition preferably has a $FRR_{21/2}$ (ISO 1133, 21.6 kg load/2.16 kg load) of 100 to 140 g/10 min, more preferably of 105 to 130 g/10 min and most preferably of 110 to 125 g/10 min.

In one embodiment, the polyethylene composition has
i) a $MFR_5$ (ISO 1133, 5 kg load) of 0.5 to 1.5 g/10 min, more preferably of 0.7 to 1.4 g/10 min and most preferably of 0.9 to 1.3 g/10 min, or
ii) a $MFR_{21}$ (ISO 1133, 21.6 kg load) of 20 to 35 g/10 min, more preferably of 20 to 33 g/10 min and most preferably of 20 to 31 g/10 min, or
iii) a $FRR_{21/2}$ (ISO 1133, 21.6 kg load/2.16 kg load) of 100 to 140 g/10 min, more preferably of 105 to 130 g/10 min and most preferably of 110 to 125 g/10 min.

Alternatively, the polyethylene composition has
i) a $MFR_5$ (ISO 1133, 5 kg load) of 0.5 to 1.5 g/10 min, more preferably of 0.7 to 1.4 g/10 min and most preferably of 0.9 to 1.3 g/10 min, and
ii) a $MFR_{21}$ (ISO 1133, 21.6 kg load) of 20 to 35 g/10 min, more preferably of 20 to 33 g/10 min and most preferably of 20 to 31 g/10 min, and
iii) a $FRR_{21/2}$ (ISO 1133, 21.6 kg load/2.16 kg load) of 100 to 140 g/10 min, more preferably of 105 to 130 g/10 min and most preferably of 110 to 125 g/10 min.

A skilled person is well aware of the fact that melt flow rate measurements as well as density and tensile modulus (and others) usually require the stabilization of the polymer to be evaluated. Nevertheless a skilled person also knows that the resulting data characterizes the evaluated polymer as such.

It is a further requirement of the present invention that the polyethylene composition has a density of at least 959 $kg/m^3$, preferably from 959 to 975 $kg/m^3$, more preferably from 960 to 970 $kg/m^3$, and most preferably from 963 to 970 $kg/m^3$.

In one embodiment, the polyethylene composition preferably has a stress at yield measured according to ISO 527-2 of at least 28 MPa, more preferably from 28 to 40 MPa and most preferably from 29 to 35 MPa.

Additionally or alternatively, the polyethylene composition preferably has a stress at break measured according to ISO 527-2 of at least 28 MPa, more preferably from 28 to 40 MPa and most preferably from 29 to 35 MPa.

Additionally or alternatively, the polyethylene composition preferably has a strain at break measured according to ISO 527-2 of at least 800%, more preferably from 800 to 900% and most preferably from 800 to 960%.

Preferably, the polyethylene composition has a
a) stress at yield measured according to ISO 527-2 of at least 28 MPa, more preferably from 28 to 40 MPa and most preferably from 29 to 35 MPa, or
b) stress at break measured according to ISO 527-2 of at least 28 MPa, more preferably from 28 to 40 MPa and most preferably from 29 to 35 MPa, or
c) strain at break measured according to ISO 527-2 of at least 800%, more preferably from 800 to 900% and most preferably from 800 to 960%.

Alternatively, the polyethylene composition has a
a) stress at yield measured according to ISO 527-2 of at least 28 MPa, more preferably from 28 to 40 MPa and most preferably from 29 to 35 MPa, and
b) stress at break measured according to ISO 527-2 of at least 28 MPa, more preferably from 28 to 40 MPa and most preferably from 29 to 35 MPa, and
c) strain at break measured according to ISO 527-2 of at least 800%, more preferably from 800 to 900% and most preferably from 800 to 960%.

According to the present invention the polyethylene composition preferably has a die swell (190° C., 2.16 kg load) of more than 1.25, preferably from 1.25 to 1.7 and most preferably from 1.25 to 1.5. Die swell denotes swell ratio (SR).

The polyethylene composition according to present invention preferably has an eta (0.05 rad/s) of at least 51 000 Pas, more preferably at least 52 000 Pas. For example, the polyethylene composition has an eta (0.05 rad/s) in the range from 51 000 to 58 000 Pas, and most preferably from 52 000 to 56 000 Pas. Eta (0.05 rad/s) can be modified by varying the amounts of LMW and HMW component and the catalyst (s) used for obtaining the same.

The polyethylene composition according to the present invention is further preferably characterized by a specific molecular weight distribution reflected by shear thinning indices as described below.

The polyethylene composition preferably has a $SHI_{2.7/210}$ of 30 to 50 when determined as described herein, more preferably 35 to 45 and most preferably 38 to 44. This shear thinning index range indicates good processability of the polyethylene composition.

It is appreciated that the polyethylene composition comprises the multimodal ethylene polymer (a) in an amount of at least 60.0 wt.-%, preferably at least 70.0 wt.-% and more preferably at least 80.0 wt.-%, based on the total weight (100.0 wt.-%) of the polyethylene composition. For example, the polyethylene composition comprises the multimodal ethylene polymer (a) in an amount from 87.0 to 99.5 wt.-%, more preferably from 90.0 to 99.5 wt.-%, even more preferably from 92.0 to 99.5 wt.-%, and most preferably from 93.0 to 99.5 wt.-%, based on the total weight (100.0 wt.-%) of the polyethylene composition.

In one embodiment, the polyethylene composition consists of the multimodal ethylene polymer (a), the carbon black product (b) and one or more additive(s). In this embodiment, the polyethylene composition comprises the multimodal ethylene polymer (a) preferably in an amount from 82.0 to 99.4 wt.-%, more preferably from 85.0 to 99.4 wt.-%, even more preferably from 87.0 to 99.4 wt.-%, still more preferably from 89.0 to 99.4 wt.-%, and most preferably from 91.0 to 99.0 wt.-%, based on the total weight (100.0 wt.-%) of the polyethylene composition.

The multimodal ethylene polymer (a) according to the present invention preferably has a $MFR_2$ (ISO 1133, 2.16 kg load) of 0.2 to 0.3 g/10 min. Preferably, the polymer composition, preferably the multimodal ethylene polymer (a), has a $MFR_2$ (ISO 1133, 2.16 kg load) of 0.2 to 0.28 g/10 min and most preferably of 0.21 to 0.25 g/10 min.

Additionally or alternatively, the multimodal ethylene polymer (a) preferably has a $MFR_5$ (ISO 1133, 5 kg load) of 0.5 to 1.5 g/10 min, more preferably of 0.7 to 1.4 g/10 min and most preferably of 0.9 to 1.3 g/10 min.

Additionally or alternatively, the multimodal ethylene polymer (a) preferably has a $MFR_{21}$ (ISO 1133, 21.6 kg load) of 20 to 35 g/10 min, more preferably of 20 to 33 g/10 min and most preferably of 20 to 31 g/10 min.

Additionally or alternatively, the multimodal ethylene polymer (a) preferably has a $FRR_{21/2}$ (ISO 1133, 21.6 kg load/2.16 kg load) of 100 to 140 g/10 min, more preferably of 105 to 130 g/10 min and most preferably of 110 to 125 g/10 min.

In one embodiment, the multimodal ethylene polymer (a) has
i) a $MFR_2$ (ISO 1133, 2.16 kg load) of 0.2 to 0.3 g/10 min, more preferably of 0.2 to 0.28 g/10 min and most preferably of 0.21 to 0.25 g/10 min, or ii) a $MFR_5$ (ISO 1133, 5 kg load) of 0.5 to 1.5 g/10 min, more preferably of 0.7 to 1.4 g/10 min and most preferably of 0.9 to 1.3 g/10 min, or iii) a $MFR_{21}$ (ISO 1133, 21.6 kg load) of 20 to 35 g/10 min, more preferably of 20 to 33 g/10 min and most preferably of 20 to 31 g/10 min, or iv) a $FRR_{21/2}$ (ISO 1133, 21.6 kg load/2.16 kg load) of 100 to 140 g/10 min, more preferably of 105 to 130 g/10 min and most preferably of 110 to 125 g/10 min.

Alternatively, the multimodal ethylene polymer (a) has
i) a $MFR_2$ (ISO 1133, 2.16 kg load) of 0.2 to 0.3 g/10 min, more preferably of 0.2 to 0.28 g/10 min and most preferably of 0.21 to 0.25 g/10 min, and ii) a $MFR_5$ (ISO 1133, 5 kg load) of 0.5 to 1.5 g/10 min, more preferably of 0.7 to 1.4 g/10 min and most preferably of 0.9 to 1.3 g/10 min, and iii) a $MFR_{21}$ (ISO 1133, 21.6 kg load) of 20 to 35 g/10 min, more preferably of 20 to 33 g/10 min and most preferably of 20 to 31 g/10 min, and iv) a $FRR_{21/2}$ (ISO 1133, 21.6 kg load/2.16 kg load) of 100 to 140 g/10 min, more preferably of 105 to 130 g/10 min and most preferably of 110 to 125 g/10 min.

It is further appreciated that the multimodal ethylene polymer (a) preferably has a density in the range from 950 to 965 kg/m$^3$, more preferably from 952 to 960 kg/m$^3$.

The molecular weight relationships defined above indicates the specific polymer broadness, i.e. implies a unique relationship between LMW and HMW portions in a MWD curve. This weighting of the molecular weight distribution occurs results in the advantageous properties which we observe in the present application.

The multimodal ethylene polymer (a) of the invention preferably comprises a LMW component (A) and a HMW component (B). The lower weight average molecular weight polyethylene polymer component (A), which is referred herein shortly as LMW component (A), has lower weight average molecular weight than higher weight average weight molecular weight polymer component (B), which is referred to herein shortly as HMW component (B). Both LMW and HMW components (A) and (B) are preferably obtainable by polymerisation using Ziegler Natta catalysis, ideally the same Ziegler Natta catalyst.

The weight ratio of LMW component (A) to HMW component (B) in the composition is preferably in the range 30:70 to 70:30, more preferably 35:65 to 65:35, most preferably 40:60 to 60:40. In some embodiments, the ratio may be 45 to 55 wt.-% of LMW component (A) and 55 to 45 wt.-% HMW component (B), such as 45 to 52 wt.-% of LMW component (A) and 55 to 48 wt.-% HMW component (B).

LMW component (A) and HMW component (B) of the multimodal ethylene polymer (a) may both be ethylene copolymers or ethylene homopolymers, although preferably at least one of said LMW and HMW components is an ethylene copolymer. Preferably, the multimodal ethylene polymer (a) comprises an ethylene homopolymer and an ethylene copolymer component. Where one of the LMW or HMW components is an ethylene homopolymer, this is preferably the component with the lower weight average molecular weight (Mw), i.e. LMW component (A).

A preferred multimodal ethylene polymer (a) therefore comprises, preferably consists of, a LMW component (A) which is an ethylene homopolymer and a HMW component (B), which is preferably an ethylene copolymer with butene as the comonomer.

The LMW component (A) of the multimodal ethylene polymer (a) preferably has an $MFR_2$ of 10 g/10 min or higher, more preferably of 50 g/10 min or higher, and most preferably 100 g/10 min or higher.

Furthermore, LMW component (A) preferably has an $MFR_2$ of 1000 g/10 min or lower, preferably 800 g/10 min or lower, and most preferably 600 g/10 min or lower. Preferred ranges are from 100 to 500 g/10 min, preferably from 150 to 400 g/10 min.

Preferably, LMW component (A) is an ethylene homo- or copolymer with a density of at least 965 kg/m$^3$. Preferably the density of the LMW component (A) is at least 970 kg/m$^3$.

Furthermore, LMW component (A) preferably has a density of 975 kg/m$^3$ or lower. Preferred ranges are from 965 to 975 kg/m$^3$, preferably from 970 to 975 kg/m$^3$.

Most preferably, LMW component (A) of the multimodal ethylene polymer (a) is an ethylene homopolymer. If LMW component (A) is a copolymer, the comonomer is preferably 1-butene.

Preferably, HMW component (B) of the multimodal ethylene polymer (a) is an ethylene homo- or copolymer with a density of less than 965 kg/m$^3$. Most preferably, HMW component (B) of the multimodal ethylene polymer (a) is a copolymer. Preferred ethylene copolymers employ one or more alpha-olefin (e.g. C3-12 alpha-olefins) as comonomer (s). Examples of suitable alpha-olefins include but-1-ene, hex-1-ene and oct-1-ene. But-1-ene is especially preferred as at least one of the comonomer(s) present in HMW component (B) of the multimodal ethylene polymer (a). Preferably, HMW component (B) of the multimodal ethylene polymer (a) comprises one comonomer which is but-1-ene.

Where herein features of LMW component (A) and/or HMW component (B) of the multimodal ethylene polymer (a) of the present invention are given, these values are generally valid for the cases in which they can be directly measured on the respective LMW component (A) or HMW component (B), e.g. when such component is separately produced or produced in the first stage of a multistage process. However, the multimodal ethylene polymer (a) may also be and preferably is produced in a multistage process wherein e.g. LMW component (A) and HMW component (B) are produced in subsequent stages. In such a case, the properties of the LMW component (A) or HMW component (B) produced in the second step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the LMW component (A) or HMW component (B) produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the LMW component (A) or HMW component (B) produced in higher stages of such a multistage process can be determined by applying either or both of the above methods. The skilled person will be able to select the appropriate method.

It is further required that the polyethylene composition comprises a carbon black product (b) in an amount ranging from 0.5 to 13.0 wt.-%, based on the total weight (100.0 wt.-%) of the polyethylene composition. Preferably, the polyethylene composition comprises the carbon black product (b) in an amount ranging from 0.5 to 10.0 wt.-%, more preferably from 0.5 to 8.0 wt.-%, still more preferably from 0.5 to 7.0 wt.-% and most preferably from 0.9 to 6.0 wt.-%, based on the total weight (100.0 wt.-%) of the polyethylene composition.

Again, it is appreciated that the carbon black product can be added to the multimodal ethylene polymer as such (neat) or in form of a so-called masterbatch (CBMB), in which carbon black is contained in concentrated form in a carrier polymer.

The carbon black product (b) in the form of a carbon black masterbatch, i.e. the mixture of carbon black and the carrier polymer, preferably comprises carbon black in an amount of from 20.0 to 70.0 wt.-%, more preferably from 40.0 to 60.0 wt.-%, based on the total weight (100.0 wt.-%) of the carbon black masterbatch. It is preferred that the carbon black product (b) is incorporated into the polyethylene composition in the form of a carbon black masterbatch. Carbon blacks for the purpose of the present invention are commercially available.

The carbon black can be of any type feasible for use in irrigation pipes or tubes. The carbon black according to the present invention has preferably an average particle size of from 0.01 to 0.30 microns.

In one embodiment carbon black useful for the present invention has preferably max volatile matter of 9 wt.-%. The type of carbon black can e.g. be furnace carbon black, which furnace carbon black has a very well-known meaning. Suitable carbon blacks are commercially available from several suppliers including Cabot and Colombian, and can be selected accordingly by a person skilled in the art. As an example, Cabot Plasblak LL2590 can be given.

It has been surprisingly found that by the provision of pellets comprising a polyethylene composition having a high density and defined MFR without added LDPE and without long chain branching, an improved die swell is obtained providing excellent melt strength and ensuring the maximum line speed superior to the comparative blends.

It is required that the polyethylene composition of the present invention is provided in pellet form to the irrigation pipe or tube producer.

The extrusion and pelletizing of the polyethylene composition can be carried out in a known manner using well known extruder equipment supplied by extruder producers and conventional extrusion conditions. As an example of an extruder for the present compounding step may be those supplied by Japan Steel works, Kobe Steel or Farrel-Pomini, e.g. JSW 460P or JSW CIM90P.

The pellets of the present invention thus comprise, preferably consist of, a polyethylene composition comprising
  a) at least 60.0 wt.-%, preferably at least 70.0 wt.-%, preferably at least 80.0 wt.-%, preferably from 87.0 to 99.5 wt.-%, of a multimodal ethylene polymer (a), based on the total weight (100.0 wt.-%) of the polyethylene composition, and
  b) from 0.5 to 13.0 wt.-% of a carbon black product (b), based on the total weight (100.0 wt.-%) of the polyethylene composition,
  wherein the polyethylene composition has
  i) a $MFR_2$ (ISO 1133, 2.16 kg load) of 0.2 to 0.3 g/10 min, and
  ii) a density measured according to ASTM D792 of at least 959 kg/m$^3$.

All preferred ranges and properties as regards the polyethylene composition, the multimodal ethylene polymer (a), the carbon black product (b) and the optional additive(s) (c) shall also hold for the pellets according to the present invention. The same holds for the proportions of the components.

The inventive pellets are particularly characterized by a die swell of more than 1.25. The method for determining die swell is given in the experimental part. Die swell denotes the swell ratio (SR).

It is appreciated that the pellets are preferably prepared by compounding the polyethylene composition, i.e. the multimodal ethylene polymer (a) and the carbon black product (b) and the optional additive(s) (c).

The compounding of the polyethylene composition is preferably carried out at a temperature profile of up to 270° C., more preferably in the range from 160 to 270° C.

The polyethylene composition is preferably pelletized in a compounding step arranged after the compounding, and optional pelletizing, of the multimodal ethylene polymer (a) in the production line of the polymerization process of the multimodal ethylene polymer (a) and the subsequent mixing of the multimodal ethylene polymer (a) and the carbon black product (b) and the optional additive(s) (c).

The compounding can be carried out in a known manner using well known extruder equipment supplied by extruder producers and conventional extrusion conditions. As an example of an extruder for the present compounding step may be those supplied by Japan Steel works, Kobe Steel or Farrel-Pomini, e.g. JSW 460P or JSW CIM90P.

The use of the pellets of the polyethylene composition of the present invention provides increased homogeneity to the polyethylene composition resulting in an irrigation pipe or tube with better quality, e.g. in terms of mechanical and surface properties, compared to irrigation pipes or tubes which have been produced by adding the multimodal ethylene polymer of the invention, carbon black product and optional additives separately to a pipe extruder during the pipe production process.

The pellets comprising the polyethylene composition of the present invention is thus particularly used for the production of drip irrigation pipes or tubes.

A pipe or pipe system denotes all articles used for transporting water or aqueous solutions of chemicals such as fertilizers, fungicides, herbicides, soil conditioners and the like. This includes the pipes as such as well as fittings. A pipe system means all articles made of polymeric material used for transporting water or aqueous solutions of chemicals such as fertilizers, fungicides, herbicides, soil conditioners and the like. The term pipe is frequently replaced by tape. It is well known in the art that relatively thin pipes are commonly denoted as tapes. As there is no clear cut, the terms pipe and tape are used as synonyms throughout the specification, claims and examples.

Preferably, the pipe or pipe system according to the present invention comprises, preferably consist of, pellets comprising a polyethylene composition, the polyethylene composition comprising
  a) at least 60.0 wt.-%, preferably at least 70.0 wt.-%, preferably at least 80.0 wt.-%, preferably from 87.0 to 99.5 wt.-%, of a multimodal ethylene polymer (a), based on the total weight (100.0 wt.-%) of the polyethylene composition, and
  b) from 0.5 to 13.0 wt.-% of a carbon black product (b), based on the total weight (100.0 wt.-%) of the polyethylene composition,
  wherein the polyethylene composition has
  i) a MFR$_2$ (ISO 1133, 2.16 kg load) of 0.2 to 0.3 g/10 min, and
  ii) a density measured according to ASTM D792 of at least 959 kg/m$^3$.

All preferred ranges and properties as regards the pellets, the polyethylene composition, the multimodal ethylene polymer (a), the carbon black product (b) and the optional additive(s) (c) shall also hold for the pipe or pipe system according to the present invention. The same holds for the proportions of the components.

The pipe or pipe system according to the present invention comprises, preferably consists of, the pellets comprising the polyethylene composition as defined herein in any of the described embodiments including preferred properties and property ranges, in any order.

The pipe or pipe system is preferably a drip irrigation pipe or drip irrigation pipe system.

The pipe or pipe system preferably has perforations along the length of the pipe. Preferably, the pipe or pipe system is provided with perforations in the pipe wall along the length of the pipe and emitters which are located at perforation points for controlling the water discharge in a desired manner.

The dimensions of the pipe or pipe system can vary depending on the size of the intended pipe and on the desired irrigation performance at the end use site, and can be chosen accordingly as known in the art.

A skilled person will further understand that a pipe or pipe system for drip irrigation may have a varying thickness depending on the individual articles such as pipes, tubing, fittings and optional emitters. However, a thin pipe or pipe system will be at least partially present.

The term "at least partially" refers to a wall thickness of less than 0.4 mm, preferably of less than 0.2 mm, encompasses systems wherein some parts or articles have thickness levels above this limit.

More preferably the pipe or pipe system according to the present invention has at least partially a wall thickness of less than 0.25 mm, even more preferably less than 0.20 mm and most preferably less than 0.19 mm.

The pipe or pipe system according to the present invention preferably has at least partially a wall thickness of 0.2 mm or less.

The pipe or pipe system according to the present invention preferably has a burst pressure of more than 0.26 MPa, most preferably more than 0.29 MPa. Such burst pressures are surprisingly observed even when the wall thickness is partially 0.2 mm or less.

Preferably the pipe or pipe system has a diameter of 35 mm or less, more preferably of 32 mm or less. The lower limit of the diameter is usually 5 mm or more.

The diameter of the perforations is typically more than 1 mm.

The pipe or pipe system preferably has a cross-section of round or ellipse shape. "Ellipse" in this regard means that the round cross-section is flattened along one axis of the cross-section to form an ellipse or oval shape.

It is preferred that the pipe or pipe system of the invention is preferably produced by an in-line process, i.e. is a product of an in-line pipe production process. Due to different insertion techniques the emitters in the in-line process are different from those of the on-line process.

The in-line emitter can contain one or more water path arrangement(s) arranged on one surface of the in-line emitter structure. The in-line emitter has typically either cylindrical structure or flat, rectangular or similar, (longitudinally) shaped structure with thickness, length and width depending on the size of the irrigation pipe and on the desired, water discharge performance at the end use site (referred herein as flat rectangular emitter).

Cylindrical emitters are used in cylindrical pipes or pipe systems and the diameter of the outer circumference is chosen so that the outer circumference contacts the inner wall of the pipe or pipe system and is adhered to said inner wall. The water path arrangement(s) is arranged on the surface of the outer circumference of said cylindrical emitters. The length of the cylindrical emitter on the size of the pipe or pipe system and on the desired, water discharge performance at the end use site. As an example said length can be 1 to 5 cm.

Flat rectangular emitters are typically used in flat pipes of ellipsoid shape. The size of the flat rectangular emitters varies depending on the size of the intended pipe or pipe system and on the desired irrigation performance at end use site. As a preferable example, the thickness of flat rectangular typically of less than 0.5 to 4 mm, length typically of than 1 to 5 cm and width of 0.4 to 2.5 cm, depending on the size of the pipe and on the desired irrigation performance at end use site. The water path arrangement(s) is provided to at least one position on the surface of the flat rectangular emitter.

In cylindrical and flat rectangular shaped emitters of the in-line produced pipe or pipe system, the water path(s) of the emitter leads to intended water discharge point and the punctured perforation of the pipe wall locates at this point.

Both in-line and on-line emitters are very well known in the state of the art and commercially available. Any available emitter could be used for the purpose.

The invention further relates to a process for the preparation of a pipe or pipe system comprising the steps of
  a) providing pellets as defined herein,
  b) extruding the pellets of step a), whereby a temperature profile of up to 270° C. is maintained over the length of the extruder, such as to obtain a pipe or pipe system, and
  c) introducing perforations for irrigation into the pipe or pipe system obtained in step b).

With regard to the definition of the pellets and preferred embodiments thereof, reference is made to the statements provided above when discussing the technical details of the pellets of the present invention.

As mentioned above, advantageously, the carbon black product, in the amounts as defined above, is homogeneously distributed in the pellets comprising the polyethylene composition which contributes markedly to the quality, i.e. mechanical and surface properties, of the obtained pipe or pipe system. Thus, it is required that pellets comprising the polyethylene composition are used in the process of the invention.

Accordingly, preferably the process of the invention comprises the steps of
  a) providing pellets comprising the polyethylene composition as defined herein,
  b) extruding the pellets of step a), whereby a temperature profile of up to 270° C. is maintained over the length of the extruder, such as to obtain a pipe or pipe system, and
  c) introducing perforations for irrigation into the pipe or pipe system obtained in step b), preferably punching perforations at intervals along the length of the formed, preferably extruded, pipe wall for discharging water from the punched perforations.

It is preferred that the pipe or pipe system comprises emitters at the location of the perforations of the pipe or pipe system. Accordingly, preferably the process for the preparation of a pipe or pipe system of the invention is an:
  on-line process, wherein the end user, e.g. farmer, punches the perforations at intervals along the length of the pipe or pipe system and inserts the emitters into the formed perforations. Thereby, the emitters are inserted into the holes from the outside of the pipe or pipe system. It is also possible that the end user does not put any emitters inside the punched holes;
or
  in-line process, wherein the perforations and emitters are provided by the pipe producer during the pipe or pipe system production process. The difference is in the order and method how said perforations and emitters are introduced into the pipe or pipe system.

In the in-line process the emitters are inserted into the inner pipe or pipe system wall, at intervals (=emitters are inserted at certain distance from each other, as desired, depending on the end application) along the pipe or pipe system length, at time of forming, preferably extruding, the pipe or pipe system.

Both on-line and in-line processes for producing a pipe or pipe system are well known techniques in the field of pipe technology.

It is preferred that the process for the preparation of the pipe or pipe system of the invention is an in-line process comprising the steps of
  a) providing pellets comprising the polyethylene composition as defined herein,
  b) extruding the pellets of step a), whereby a temperature profile of up to 270° C. is maintained over the length of the extruder, such as to obtain a pipe or pipe system,
  b1) inserting emitters at intervals into the inner pipe wall along the length of the pipe at time of the formation, preferably at time of extrusion, of said pipe shape, and
  c) introducing perforations for irrigation into the pipe or pipe system obtained in step b1), preferably punching perforations at intervals along the length of the formed, preferably extruded, pipe wall for discharging water from the punched perforations.

Preferably the pipe or pipe system of the invention is produced by extrusion using a pipe extruder. Preferably, extruding step b) is carried out at a temperature profile of up to 270° C., preferably in the range from 170 to 270° C., in a manner well known in the art. Pipe extruders are well known in the art and commercially available.

Moreover, the preferred pipe emitter feeding equipment for pipe extruders to insert the emitters inside the pipe during the pipe formation as well as perforation equipment for hole punching are well known in the art and commercially available.

In process step b1) the emitters are inserted into the inner pipe wall, at intervals along the pipe length, at time of forming, preferably by extruding, the pipe shape and before perforation (punching) further downstream of the process, i.e. before process step c) is carried out.

Perforations are provided after cooling the formed pipe or pipe system containing the inserted emitters. That is to say, process step c) is carried out after step b1), if present. Perforation is introduced by punching a hole to the pipe wall at the location of each emitter. After perforation, the pipe or pipe system is coiled for end use.

The perforation (punching) of the pipe or pipe system is effected at the intended water path point of the emitter. In case the emitter has two or more water path arrangements the perforation (punching) is done at the location of each intended water discharge point.

The process according to the present invention is preferably carried out at a line speed in the range from 190 to 280 m/min. Such extremely high line speeds are enabled by the polyethylene composition according to the invention and extrusion at the given temperatures. However, it is appreciated that the line speed is not limited as it depends on the extrusion equipment used. Thus, the given range is only considered as example and may be adapted by the skilled person according to the process equipment used. Line speed can be calculated from the amount of finished product in meters/minute that is coiled from the end of the line. All properties of the polyethylene composition as described above and in the following also pertain to the process according to the present invention.

The polyethylene composition according to the present invention is provided in form of pellets. Additional stabilizer(s) may be introduced during extrusion step b).

The extrusion and pelletizing can be carried out on commercially available extruder equipment supplied by extruder producers. Examples are Japan Steel works, Kobe Steel or Farrel-Pomini.

It is preferred that the pellets provided in step a) are preferably prepared by compounding the multimodal ethylene polymer (a) and the carbon black product (b) and the optional additive(s) (c). The compounding of the multimodal ethylene polymer (a) and the carbon black product (b) and the optional additive(s) (c) is preferably carried out at a temperature profile of up to 270° C., more preferably in the range from 160 to 270° C.

It is preferred that the multimodal ethylene polymer is prepared by
i) polymerizing ethylene such as to form a LMW component (A), and
ii) polymerizing ethylene and optionally at least one C3-20 alpha olefin comonomer in the presence of component (A) obtained in step i) such as to form a HMW component (B), and
iii) compounding the product obtained in step ii) optionally, and preferably, in the presence of additives to yield pellets.

Preferably, polymerizing steps i) and ii) may be carried out by polymerisation in one reactor using conditions which create a multimodal (e.g. bimodal) polymer product, e.g. using a catalyst system or mixture with two or more different catalytic sites, each site obtained from its own catalytic site precursor, or by polymerisation using a two or more stage, i.e. multistage, polymerisation process with different process conditions in the different stages or zones (e.g. different temperatures, pressures, polymerisation media, hydrogen partial pressures, etc.) and using same or different catalyst systems, preferably the same catalyst system.

Polymer compositions produced in a multistage process are also designated as "in-situ" blends.

Most preferably, polymerizing steps i) and ii) are carried out by in-situ blending in a multistage process. The process for the preparation of the multimodal ethylene polymer of the invention preferably involves:
i) polymerizing ethylene such as to form a LMW component (A), and subsequently
ii) polymerizing ethylene and optionally at least one C3-20 alpha olefin comonomer in the presence of component (A) obtained in step i) such as to form a HMW component (B), and
iii) compounding the product obtained in step ii) to yield pellets.

It is preferred if at least one of polymerizing steps i) and ii) is produced in a gas-phase reaction.

It is further preferred, if one of polymerizing steps i) and ii), preferably polymerizing step i), is carried out in a slurry reaction, preferably in a loop reactor, and one of polymerizing steps i) and ii), preferably polymerizing step ii), is produced in a gas-phase reaction.

Preferably, the multimodal ethylene polymer (a) is produced by a multistage ethylene polymerisation, e.g. using a series of reactors, with optional comonomer addition preferably in only the reactor(s) used for production of the HMW component (B) or differing comonomers used in each stage. A multistage process is defined generally to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, batch reactors etc. (see for example WO97/44371 and WO96/18662).

Accordingly, it is preferred that polymerizing steps i) and ii) are carried out in different stages of a multistage process.

Preferably, the multistage process comprises at least one gas phase stage in which, preferably, polymerizing step ii) is carried out.

It is further preferred, if polymerizing step ii) is carried out in a subsequent stage in the presence of LMW component (A) which has been produced in previous polymerizing step i).

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages, i.e. polymerizing steps i) and ii), of the multistage process for producing the polyethylene composition according to the invention are such as described in EP 517 868, i.e. the production of LMW and HMW components (A) and (B) is carried out as a combination of slurry polymerisation for LMW component (A)/gas-phase polymerisation for HMW component (B). The slurry polymerisation is preferably performed in a so-called loop reactor. Further preferred, the slurry polymerisation stage precedes the gas phase stage.

Optionally, the main polymerisation stages, i.e. polymerizing steps i) and ii), may be preceded by a prepolymerisation, in which case up to 20% by weight, preferably 1 to 10% by weight, more preferably 1 to 5% by weight, of the total composition is produced. The prepolymer is preferably an ethylene homopolymer. At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end. Where prepolymerisation is used, the prepolymer formed can be regarded as forming part of the lower molecular weight fraction (A). I.e. the optional prepolymer component is counted to the amount (wt %) of LMW component (A).

Preferably, the polymerisation conditions in the preferred two-stage method are chosen so that the comparatively low-molecular weight polymer containing no comonomer is produced in one stage, preferably the first stage, owing to a high content of chain-transfer agent (hydrogen gas), whereas the high-molecular weight polymer having a content of comonomer is produced in another stage, preferably the second stage. The order of these stages may, however, be reversed.

In a preferred embodiment, the polymerisation in a loop reactor is followed by a gas-phase reactor, the polymerisation temperature in the loop reactor preferably is 85 to 115° C., more preferably is 90 to 105° C., and most preferably is 92 to 100° C. The temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 100 to 800 moles of $H_2$/kmoles of ethylene are added to the reactor, when the LMW fraction is produced in this reactor, and 50 to 500 moles of $H_2$/kmoles of ethylene are added to the gas phase reactor when this reactor is producing the HMW fraction.

Polymerizing steps i) and ii) are preferably carried out in the presence of a polymerisation catalyst. The polymerisation catalyst may be a coordination catalysts of a transition metal, such as Ziegler-Natta (ZN), metallocene, non-metallocene, Cr-catalyst etc. The catalyst may be supported, e.g. with conventional supports including silica, Al-containing supports and magnesium dichloride based supports. Preferably the catalyst is a ZN catalyst, more preferably the catalyst is silica supported ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis, EP 0 688 794 and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

It is preferred that the catalyst used in polymerizing step i) is also used in polymerizing step ii). It is generally transferred from polymerizing step i) to the polymerizing step ii).

As well known, the Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount of activator used depends on the specific catalyst and activator. Typically triethyl aluminium is used in such amount that the molar ratio of aluminium to the transition metal, like Al/Ti, is from 1 to 1000, preferably from 3 to 100.

The resulting end product, i.e. the multimodal ethylene polymer, consists of an intimate mixture of the polymers (herein LMW component (A) and HMW component (B)) from the two or more reactors, the different molecular-weight-distribution curves of these polymers together forming a molecular-weight-distribution curve having a broad maximum or two or more maxima, i.e. the end product is a bimodal or multimodal polymer mixture.

The multimodal ethylene polymer (a) is recovered from the polymerisation reactor including conventional post-reactor treatment and then compounded in a conventional extruder to form the multimodal ethylene polymer (a) in pellet form.

Preferably, the multimodal ethylene polymer (a) comprises the multimodal ethylene polymer as the sole polymer component.

It is appreciated that the advantages of the present invention are obtained if the multimodal ethylene polymer (a), preferably in form of pellets, more preferably obtained in compounding step iii), is mixed with the carbon black product (b) and compounded in an extruder.

Thus, the multimodal ethylene polymer (a) is preferably prepared by compounding, and optionally pelletizing, the multimodal ethylene polymer (a) and the carbon black product at a temperature profile of up to 270° C. Preferably the compounding, and optionally pelletizing, of the multimodal ethylene polymer (a) and the carbon black product is carried out at a temperature profile in the range from 160 to 270° C.

The compounding can be carried out in a known manner using well known extruder equipment supplied by extruder producers and conventional extrusion conditions. As an example of an extruder for the compounding step may be those supplied by Japan Steel works, Kobe Steel or Farrel-Pomini, e.g. JSW 460P or JSW CIM90P.

The polyethylene composition according to the present invention has good stiffness, good processability (e.g. in terms of melt strength), excellent die swell. The multimodal ethylene polymer (a) of the polyethylene composition is multimodal with respect to the weight average molecular weight distribution.

Many multimodal HDPE resins are commercially available. None of these prior art polymers however, have the particular features of the invention, which contribute to the highly desirable property balance of the invention.

The use of pellets comprising the polyethylene composition of the invention, i.e. the multimodal ethylene polymer (a) and the carbon black product (b), results in pipes or pipe systems with advantageous property balance, especially in terms of stiffness, impact strength, die swell, melt strength and processability.

Moreover, the pellets comprising the polyethylene composition of the invention provide sufficiently high melt strength without the introduction of long chain branching to the polymer.

The present invention is further characterized by means of the following examples:

EXAMPLES

Figure 1:
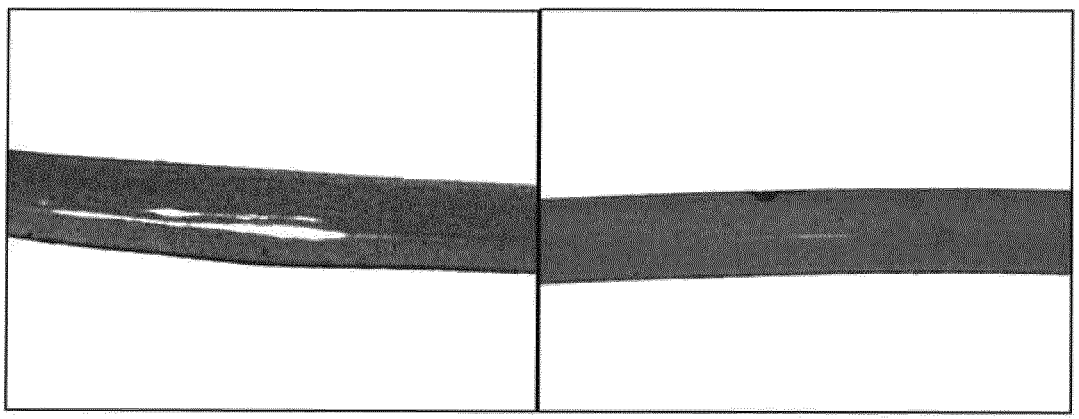
FIG. 1 refers to a micrographic picture of comparative example CE2(a).

1. Test Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature 190° C. and a load of 5 kg, the $MFR_2$ of polyethylene at a temperature 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/2}$ denotes the ratio of $MFR_{21}/MFR_2$.

b) Density

Density of the polymer was measured according to ASTM; D792, Method B (density by balance at 23° C.) on compression moulded specimen prepared according to EN ISO 1872-2 (February 2007) and is given in kg/m³.

c) Comonomer Content

Comonomer content in polyethylene was measured in a known manner based on Fourier transform infrared spectroscopy (FTIR) calibrated with $^{13}$C-NMR, using Nicolet Magna 550 IR spectrometer together with Nicolet Omnic FTIR software.

Films having a thickness of about 250 μm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

d) Die Swell

The extrudate swell (die swell) was evaluated by measuring afterwards the strands cut during the MFR measurement according to ISO 1133, at 190° C. with 2.16 kg load. Three pieces of ca 2.5 cm long strands were collected and the diameters were measured with a caliber (readability 0.01 mm).

The die swell results are expressed as swell ratios (SR), i.e. ratios of the diameter of the extruded strand to the diameter of the capillary die (=2.095 mm). The reported swell ratios were calculated from the averages of measured strand diameters.

e) Tensile Properties

Stress at yield, stress at break and strain at break were measured on injection molded samples according to ISO 527-2, Specimen type Multipurpose bar 1A, 4 mm thick. Tensile modulus was measured at a speed of 1 mm/min. Sample preparation was done according to ISO 1872-2.

f) Rheological Parameters Shear Thinning Index $SHI_{2.7/210}$

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression molded plates using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η" and the loss tangent, tan η, which can be expressed as follows:

$$G' = \frac{\sigma_0}{\gamma_0}\cos\delta [Pa] \quad (3)$$

$$G'' = \frac{\sigma_0}{\gamma_0}\sin\delta [Pa] \quad (4)$$

$$G^* = G' + iG'' [Pa] \quad (5)$$

$$\eta^* = \eta' - i\eta'' [Pa \cdot s] \quad (6)$$

$$\eta' = \frac{G''}{\omega} [Pa \cdot s] \quad (7)$$

$$\eta'' = \frac{G''}{\omega} [Pa \cdot s] \quad (8)$$

The determination of so-called Shear Thinning Index, which correlates with MWD and is independent of Mw, is done as described in equation 9.

$$SHI_{(x/y)} = \frac{Eta^* \text{ for } (G^* = x\ kPa)}{Eta^* \text{ for } (G^* = y\ kPa)} \quad (9)$$

For example, the $SHI_{(2.7/210)}$ is defined by the value of the complex viscosity, in Pa s, determined for a value of G* equal to 2.7 kPa, divided by the value of the complex viscosity, in Pa s, determined for a value of G* equal to 210 kPa.

The values of storage modulus (G'), loss modulus (G"), complex modulus (G*) and complex viscosity (η*) were obtained as a function of frequency (ω).

Thereby, e.g. $\eta^*_{300\ rad/s}$ ($eta^*_{300\ rad/s}$) is used as abbreviation for the complex viscosity at the frequency of 300 rad/s and $\eta^*_{0.05\ rad/s}$ ($eta^*_{0.05\ rad/s}$) is used as abbreviation for the complex viscosity at the frequency of 0.05 rad/s.

The loss tangent tan (delta) is defined as the ratio of the loss modulus (G") and the storage modulus (G') at a given frequency. Thereby, e.g. $\tan_{0.05}$ is used as abbreviation for the ratio of the loss modulus (G") and the storage modulus (G') at 0.05 rad/s and $\tan_{300}$ is used as abbreviation for the ratio of the loss modulus (G") and the storage modulus (G') at 300 rad/s. The elasticity balance $\tan_{0.05}/\tan_{300}$ is defined as the ratio of the loss tangent $\tan_{0.05}$ and the loss tangent $\tan_{300}$.

Besides the above mentioned rheological functions one can also determine other rheological parameters such as the so-called elasticity index EI(x). The elasticity index EI(x) is the value of the storage modulus (G') determined for a value of the loss modulus (G") of x kPa and can be described by equation 10.

$$EI(x)=G' \text{ for } (G''=x \text{ kPa}) \text{ [Pa]} \quad (10)$$

For example, the EI(5 kPa) is the defined by the value of the storage modulus (G'), determined for a value of G" equal to 5 kPa.

The viscosity $\text{eta}_{747}$ is measured at a very low, constant shear stress of 747 Pa and is inversely proportional to the gravity flow of the polyethylene composition, i.e. the higher $\text{eta}_{747}$ the lower the sagging of the polyethylene composition.

The polydispersity index, PI, is defined by equation 11.

$$PI = \frac{10^5}{G'(\omega_{COP})},$$
$$\omega_{COP} = \omega \text{ for } (G' = G'') \quad (11)$$

where $\omega_{COP}$ is the cross-over angular frequency, determined as the angular frequency for which the storage modulus, G', equals the loss modulus, G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

References:
[1] "Rheological characterization of polyethylene fractions", Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362.
[2] "The influence of molecular structure on some rheological properties of polyethylene", Heino, E. L., Borealis Polymers Oy, Porvoo, Finland, Annual Transactions of the Nordic Rheology Society, 1995.
[3] "Definition of terms relating to the non-ultimate mechanical properties of polymers", Pure & Appl. Chem., Vol. 70, No. 3, pp. 701-754, 1998.

2. Examples

Example Ex 1: Production of the Multimodal Ethylene Polymer of the Invention

A loop reactor having a volume of 500 dm³ was operated at 95° C. and 60 bar pressure for producing the lower molecular weight polymer component (A). Into the reactor were introduced 110 kg/h of propane diluent, ethylene and hydrogen together with the Lynx 200 (TM) catalyst as manufactured and supplied by BASF (SE) and TEAL (triethylaluminium) as the cocatalyst.

The polymer slurry was withdrawn from the second loop reactor and transferred into a flash vessel operated at 3 bar pressure and 70° C. temperature where the hydrocarbons were substantially removed from the polymer. The polymer was then introduced into a gas phase reactor operated at a temperature of 85° C. and a pressure of 20 bar. In addition ethylene, 1-butene, nitrogen as inert gas and hydrogen were introduced into the reactor. The polymerization feeds and conditions are shown in Table 1. The resulting polymer was purged with nitrogen (about 50 kg/h) for one hour, stabilised with conventional UV stabilisers and Ca-stearate and then extruded to pellets in a counter-rotating twin screw extruder CIM90P (manufactured by Japan Steel Works) so that the throughput was 221 kg/h and the screw speed was 349 rpm. The temperature profile is in each zone was 90/120/190/250° C.

TABLE 1

| Polymerisation feeds and conditions | |
|---|---|
| | IE |
| Reactor 1 - Loop | |
| Temperature (° C.) | 95 |
| Pressure (kPa) | 60 |
| C2 concentration (mol %) | 4.0 |
| H2/C2 ratio (mol/kmol) | 670 |
| C4/C2 ratio (mol/kmol) | 0 |
| Production rate (kg/h) | 36 |
| split % | 51 |
| $MFR_2$ (g/10 min) | 310 |
| Density (kg/m³) | 970 |
| Reactor 2 - Gas Phase | |
| Temperature (° C.) | 85 |
| Pressure (kPa) | 20 |
| H2/C2 ratio (mol/kmol) | 100 |
| C4/C2 ratio (mol/kmol) | 50 |
| Production rate (kg/h) | 34 |
| Split % | 49 |
| $MFR_2$ (g/10 min) | 0.2 |
| $MFR_5$ (g/10 min) | 1.1 |
| $MFR_{21}$ (g/10 min) | 28 |
| Final density (kg/m³) | 954 |

Pellets of the inventive example IE and comparative example CE1 were prepared by compounding 93.9 wt.-% of base PE resin, 5.8 wt.-% of a carbon black masterbatch (CB in LLDPE carrier) and 0.3 wt.-% of conventional additives (antioxidants) in KOBE LCM80H-continuous mixer using a temperature profile of 201/199/183/177/185/190/220/225° C. SEI was 0.210 kW/hr.

The pellet properties of the inventive and comparative examples are outlined in table 2.

TABLE 2

| Properties of the pellets of the comparative and inventive examples. | | | |
|---|---|---|---|
| | CE1 | CE2 | IE |
| Appearance | Black | Natural | Black |
| Amount of carbon black (wt.-%*) | 2.6 | 0 | 2.1 |
| $MFR_2$ (g/10 min) | 0.5 | 0.3 | 0.24 |
| $MFR_5$ (g/10 min) | 1.9 | 1.3 | 1.1 |
| $MFR_{21}$ (g/10 min) | 36 | 33 | 28 |
| FRR 21/2 | 70 | 110 | 120 |
| Eta at 0.05 rad/s | 26 000 | 44 000 | 53 000 |

TABLE 2-continued

Properties of the pellets of the comparative and inventive examples.

| | CE1 | CE2 | IE |
|---|---|---|---|
| (Pa · s) | | | |
| SHI (2.7/210) | 20 | 44 | 40 |
| Stress at yield (MPa) | 24 | 31 | 30 |
| Stress at break (MPa) | 24 | 16 | 30 |
| Strain at break (MPa) | 700 | 850 | 820 |
| Die swell at 190° C., 2.16 kg | 1.2 | 1.3 | 1.3 |
| Density (kg/m³) | 959 | 959 | 965 |

*wt.-% of carbon black was based on the total amount of the polyethylene composition (100.0 wt.-%) and refers to the amount of carbon black as such.
"CE1" comprises a polymer being a natural base resin having a density of 949 kg/m³.
"CE2" is a natural base resin having a density of 959 kg/m³. Carbon black was added prior pipe extrusion.

Both natural and black pellets were produced. The pellets denoted natural were pellets without carbon black, whereas the pellets denoted black contained carbon black.

Drip Irrigation Pipe Production

The thin wall drip irrigation pipe production of CE1 was carried out by using a single screw extruder having screw diameter of 75 mm and L/D ratio of 40. The temperature profile was 245-245-245-245-245° C.

CE2(a), CE2(b) and IE samples of thin wall drip irrigation pipes were prepared using an extruder having a screw diameter of 65 mm and L/D ratio of 38. The temperature profile was 180-250-265-265-265-265° C. Table 3 summarises the pipe production results and the tape properties. The CE2(a) and CE2(b) pipes were produced using a dry blend consisting of 3 wt.-% of carbon black masterbatch (CB in LLDPE carrier) and 97 wt.-% of the base resin of the CE2 pellets. CE2 pellets and CBMB pellets were mixed prior tape production.

TABLE 3

Pipe production results and pipe properties

| | CE1 | CE2(a) | CE2(b) | IE |
|---|---|---|---|---|
| Amount of CB added (wt.-%) during pipe production | 0 | 3.0 | 3.0 | 0 |
| Tape wall thickness (mm) | 0.2 | 0.16 | 0.14-0.15 | 0.15 |
| Line speed used in tape production (m/min) | 130 | 190 | 200 | 200 |
| Elongation at pull-out strength of 110N (%) | 9.5 | nm | 3.0 | 3.5 |
| Elongation at pull-out strength of 130N (%) | nm | nm | 7.0 | 12.0 |
| Burst pressure (MPa) | 0.28 | nm | 0.36 | 0.29 |
| Density (kg/m³) | 959 | 965 | 963 | 965 |
| Amount of carbon black (wt.-%*) | 2.6 | 1.2 | 1.2 | 2.1 |
| homogeneity | nm | poor | poor | excellent |
| Tensile at yield (MPa) | nm | 26 | 27 | 27 |
| Tensile strength at break (MPa) | nm | 21 | 27 | 23 |
| Nominal strain at break (%) | nm | 90 | 190 | 240 |

*wt.-% of carbon black was based on the total amount of the polyethylene composition (100 wt.-%) and refers to the amount of carbon black as such.

Figure 2:
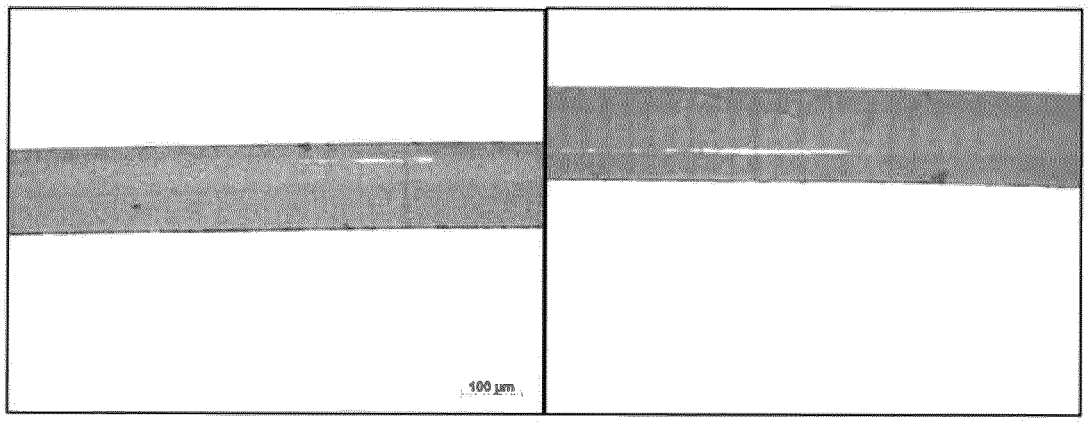
FIG. 2 refers to a micrographic picture of comparative example CE2(b).
Figure 3:
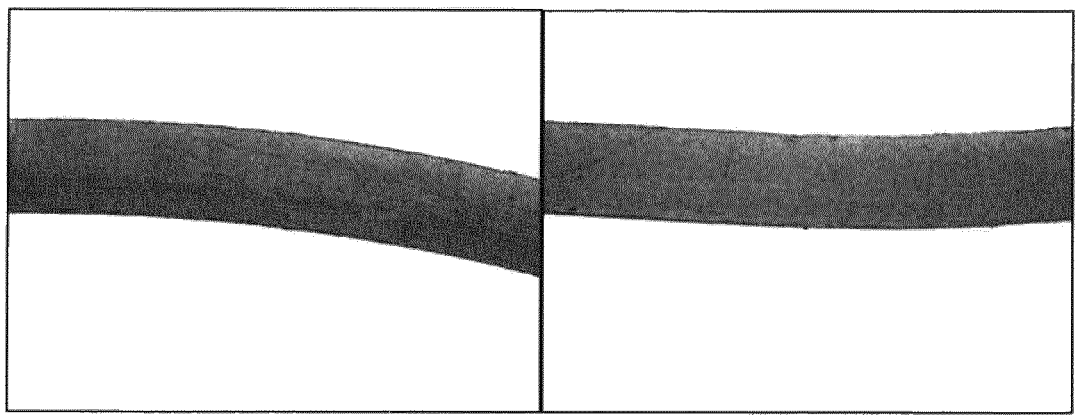
FIG. 3 refers to a micrographic picture of inventive example IE.

FIGS. 1-3 show the micrographs of cross sections cut from CE2(a), CE2(b) and IE. CE2(a) and CE2(b) show poor mixing of carbon black and white domains are clearly visible. On the other hand, the IE sample is homogenenous and good carbon black distribution is evident.

Compared to CE1, the pipes produced from IE show excellent mechanical properties. The pull out test elongation (110N/15 min) of CE1 is 9.5%, whereas the IE shows elongation of 3.5%. The burst pressure of CE1 and IE is comparable, eventhough the wall thickness of CE1 is 0.2 mm and the wall thickness of IE is 0.15 mm. This demonstrates that IE shows superior mechanical properties compared with CE1, which enables thinner walls in drip irrigation tapes while maintaining the mechanical properties.

IE shows excellent homogeneity and carbon black distribution compared to the comparative examples leading to improved processability and UV resistance. On the other hand, the high density of the IE leads to superior mechanical properties of drip irrigation tapes enabling thinner walls while keeping sufficient mechanical performance of the tapes. The inventive example IE thus shows better homogeneity and mechanical properties over the comparative examples of the prior at and highly feasible processability when producing the pipes.

The invention claimed is:

1. Pellets comprising a polyethylene composition, the polyethylene composition comprising:
    a) at least 60.0 wt. % of a multimodal ethylene polymer (a), based on the total weight (100.0 wt. %) of the polyethylene composition, and
    b) from 0.5 to 13.0 wt. % of carbon black product (b), based on the total weight (100.0 wt. %) of the polyethylene composition,
    wherein the polyethylene composition has
        i) a $MFR_2$ (ISO 1133, 2.16 kg load) of 0.2 to 0.3 g/10 min, and
        ii) a density measured according to ASTM D792 of at least 959 kg/m³.

2. The pellets according to claim 1, wherein the multimodal ethylene polymer (a) has:
    a) a density measured according to ASTM D792 in the range from 950 to 965 kg/m³, and/or
    b) a $MFR_2$ (ISO 1133, 2.16 kg load) of 0.2 to 0.3 g/10 min, and/or
    c) a $MFR_5$ (ISO 1133, 5 kg load) of 0.5 to 1.5 g/10 min, and/or
    d) a $MFR_{21}$ (ISO 1133, 21.6 kg load) of 20 to 35 g/10 min, and/or
    e) a $FRR_{21/2}$ (ISO 1133, 21.6 kg load/2.16 kg load) of 90 to 130 g/10 min.

3. The pellets according to claim 1, wherein the carbon black product (b) is carbon black as such or a carbon black masterbatch comprising carbon black and carrier polymer (s).

4. The pellets according to claim 1, wherein the carbon black product (b) is carbon black as such (neat) and present in the polyethylene composition in an amount from 0.5 to 10.0 wt. %, based on the total weight (100.0 wt.-%) of the polyethylene composition, or the carbon black product (b) is a carbon black masterbatch and present in the polyethylene composition in an amount from 0.5 to 10.0 wt., based on the total weight (100.0 wt.-%) of the polyethylene composition.

5. The pellets according to claim 1, wherein the polyethylene composition has:
    a) a $MFR_5$ (ISO 1133, 5 kg load) of 0.5 to 1.5 g/10 min, and/or
    b) a $MFR_{21}$ (ISO 1133, 21.6 kg load) of 20 to 35 g/10 min, and/or
    c) a $FRR_{21/2}$ (ISO 1133, 21.6 kg load/2.16 kg load) of 100 to 140 g/10 min.

6. The pellets according to claim 1, wherein the polyethylene composition has:
    a) an eta (0.05 rad/s) of at least 51 000 Pas, and/or
    b) a $SHI_{2.7/210}$ of 30 to 50, and/or
    c) a die swell (190° C., 2.16 kg load) of at least 1.25.

7. The pellets according to any one of claims 1 to 6, wherein the polyethylene composition has:
   a) a stress at yield measured according to ISO 527-2 of at least 28 MPa, and/or
   b) a stress at break measured according to ISO 527-2 of at least 28 MPa, and/or
   c) a strain at break measured according to ISO 527-2 of at least 800%.

8. A pipe or pipe system comprising the pellets according to claim 1.

9. The pipe or pipe system according to claim 8, wherein the pipe or pipe system is a drip irrigation pipe or drip irrigation pipe system.

10. The pipe or pipe system according to claim 8, wherein the pipe or pipe system has a wall thickness of less than 0.4 mm.

11. The pipe or pipe system according to claim 8, wherein the pipe or pipe system has a wall thickness of less than 0.2 mm and a burst pressure of more than 0.26 MPa.

12. A process for the preparation of a pipe or pipe system comprising the steps of:
   a) providing pellets according to claim 1,
   b) extruding the pellets of step a), whereby a temperature profile of up to 270° C. is maintained over the length of the extruder, such as to obtain a pipe or pipe system,
   c) introducing perforations for irrigation into the pipe or pipe system obtained in step b).

13. The process according to claim 12, wherein the line speed is in the range from 190 to 280 m/min.

14. The process according to claim 12, wherein the pellets of step a) are prepared by compounding the multimodal ethylene polymer (a) and the carbon black product (b) at a temperature profile of up to 270° C.

15. The process according to claim 14, wherein the multimodal ethylene polymer (a) is prepared by
   i) polymerizing ethylene such as to form a LMW component (A), and
   ii) polymerizing ethylene and optionally at least one C3-20 alpha olefin comonomer in the presence of component (A) obtained in step i) such as to form a HMW component (B), and
   iii) compounding the product obtained in step ii) to yield pellets.

\* \* \* \* \*